UNITED STATES PATENT OFFICE.

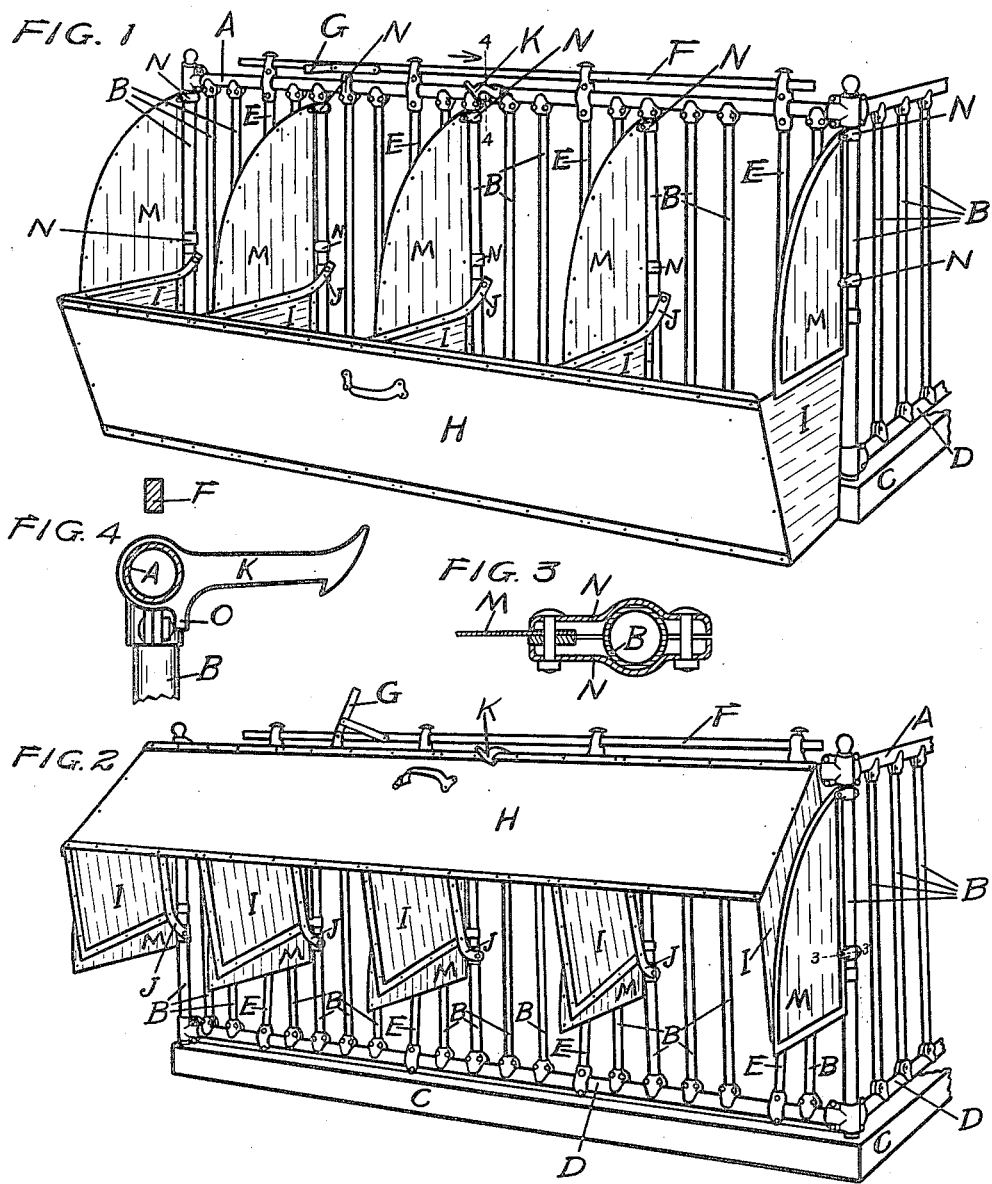

ALBERT H. NELLER, OF FAIRFIELD, IOWA, ASSIGNOR TO LOUDEN MACHINERY CO., OF FAIRFIELD, IOWA, A CORPORATION.

MANGER FOR ANIMAL PENS AND STALLS.

1,124,058.    Specification of Letters Patent.    Patented Jan. 5, 1915.

Application filed October 25, 1913. Serial No. 797,160.

*To all whom it may concern:*

Be it known that I, ALBERT H. NELLER, a citizen of the United States, residing at Fairfield, in the county of Jefferson and State of Iowa, have invented a new and useful Improvement in Mangers for Animal Pens and Stalls, of which the following is a specification.

My invention relates to that class of mangers used with cattle pens or stalls and which have divisions whereby they are more easily cleaned; and it consists of an arrangement of parts whereby the divisions of the manger are made in two sections, the upper sections or shields being attached to the posts of the pen or stall so as to remain stationary while the lower sections are hinged to the posts and adapted to telescope or slide along the sides of the stationary sections when being raised and lowered. Also, of other features set forth in the specification and more definitely pointed out in the claims.

In the accompanying drawings which form a part of this specification, Figure 1, is a perspective of a portion of a pen which is used for holding cows or calves and which embodies the features of my invention. Fig. 2, is the same, showing the lower sections of the manger in raised position. Fig. 3, is an enlarged horizontal section on line 3—3 of Fig. 2. Fig. 4, is an enlarged detail view drawn in transverse section on line 4—4 of Fig. 1, looking in the direction of the arrow.

Referring to the drawings, A represents the top rails and B, the upright posts of a cow or calf pen which may be connected directly to the floor of the building in which the pen is located, or be attached to the curb "C" or to a lower rail "D" as shown in the drawings. One side of the pen is usually provided with stanchion members "E" which are hinged at their lower ends and may be opened and closed by means of a shift-rod "F" operated by a lever "G". A movable manger consisting of a back, "H", and divisions "I" is attached to the side of the pen or stall where the animals are fed by means of hinges "J" connected to the principal posts, "B", whereby, the manger may be raised from the feeding position shown in Fig. 1, to the cleaning position shown in Fig. 2. Mangers are generally constructed in this way but in many instances the divisions constructed in this manner are not high enough to insure a good separation between the adjacent animals. Especially it is necessary to have a more effective separation when calves are fed milk to prevent them from sucking each other's ears, which is bad for the calves and in other ways highly objectionable. For some purposes, it may be necessary to make the manger division "I" higher in proportion to the pen than is shown in the drawings, but to do so would make them heavier to handle and frequently would throw the manger out of proportion. To overcome these difficulties and provide ample separation between the animals, I construct the manger divisions in two sections, the lower section "I" hinged to the posts at the inner upper edge as shown, and the upper sections or shields "M" being rigidly connected at their inner edges to the posts by clamps "N". These shields are entirely independent of each other at their outer edges, and said edges are curved on a radius corresponding with the pivots of the lower sections and are made small enough to let the back "H" swing freely over them. In this way the lower, or movable sections, and the upper or stationary sections of the divisions will virtually telescope on each other, or the hinged divisions will slide past the stationary divisions when being raised and lowered and the back H will pass over them. These divisions can be readily attached to different kinds of pens or stalls and may be arranged in various ways to suit requirements.

In place of the metal back H, the bottom of the manger may be extended up to form an immovable back, and the movable sections I of the divisions may be otherwise connected together, or not be connected together as may be desired, and as will be readily understood by those skilled in the art.

The upper sections or shields M are for the purpose of extending or supplementing the divisions above the manger, and thus effecting a more perfect separation between the different sections of the manger than would be afforded by the lower sections I, alone.

The manger may be held in raised position by a hook, "K", pivoted on the top rail, "A", so as to catch over the edge of the manger as shown in Fig. 2. To hold the latch "K" in the proper position to automatically hook over the edge of the manger when raised, I fit it with a downwardly projecting lug or finger, "O" which will come in contact with the edge of the clamp which connects the top rail "A" to one of the posts "B" in such a way as to hold the hook at the proper height to automatically catch and hold the edge of the manger. The entire arrangement is simple, inexpensive and thoroughly effective in operation.

What I claim is—

1. A manger for animal-pens or stalls having a series of upright posts, and a division in the manger composed of two sections, the lower or movable section hinged at its inner upper end to one of the posts, in combination with the stationary upper section comprising a shield constructed as a plane disconnected at its outer edge and affixed at its inner edge to said post above the lower section, so as to form practically an upper extension of the lower section, whereby the latter may be rotated on its pivot and telescoped with the upper section.

2. A manger for animal pens or stalls comprising an upright frame-work, and divisions in the manger, each composed of two sections, the lower or movable sections hinged to the upright frame, in connection with stationary upper sections comprising shields entirely independent of each other at their outer edges, and supported on the upright at their inner edges at points above the lower sections, and in extension of the lower sections, whereby the latter may be rotated on their pivots and telescoped with the upper sections.

3. The combination with a series of posts and a manger, of divisions for the manger, each division comprising an upper and a lower section, the lower sections forming permanent parts of the manger, and the upper sections independently clamped to certain posts above and just to one side of the lower sections of the division with which the latter have telescopic connection, the adjacent edges of said sections always overlapping throughout the length of one of them.

4. The combination with a series of posts, divisions, each of which comprises an upper and lower section, means for rigidly connecting the latter sections together at their outer edges, clamps for independently attaching the upper sections or shields to the posts to which the lower sections are hinged at a point above and slightly out of alinement therewith, whereby to constitute a telescopic continuation thereof throughout the length of one of them.

5. The combination with a series of posts, a manger, and hinges for pivotally connecting the manger to certain of the posts, of divisions comprising upper and lower sections, the lower sections constituting a permanent part of the manger, and the upper sections or shields secured at their inner edges to posts, with their outer edges free and unobstructed, said upper sections set parallel with the lower sections and slightly out of alinement therewith, the adjacent or meeting edges of the sections overlapping throughout the width of the widest portion of the upper sections or shields.

ALBERT H. NELLER.

Witnesses:
H. H. NIEMANN,
H. M. WARD.